UNITED STATES PATENT OFFICE.

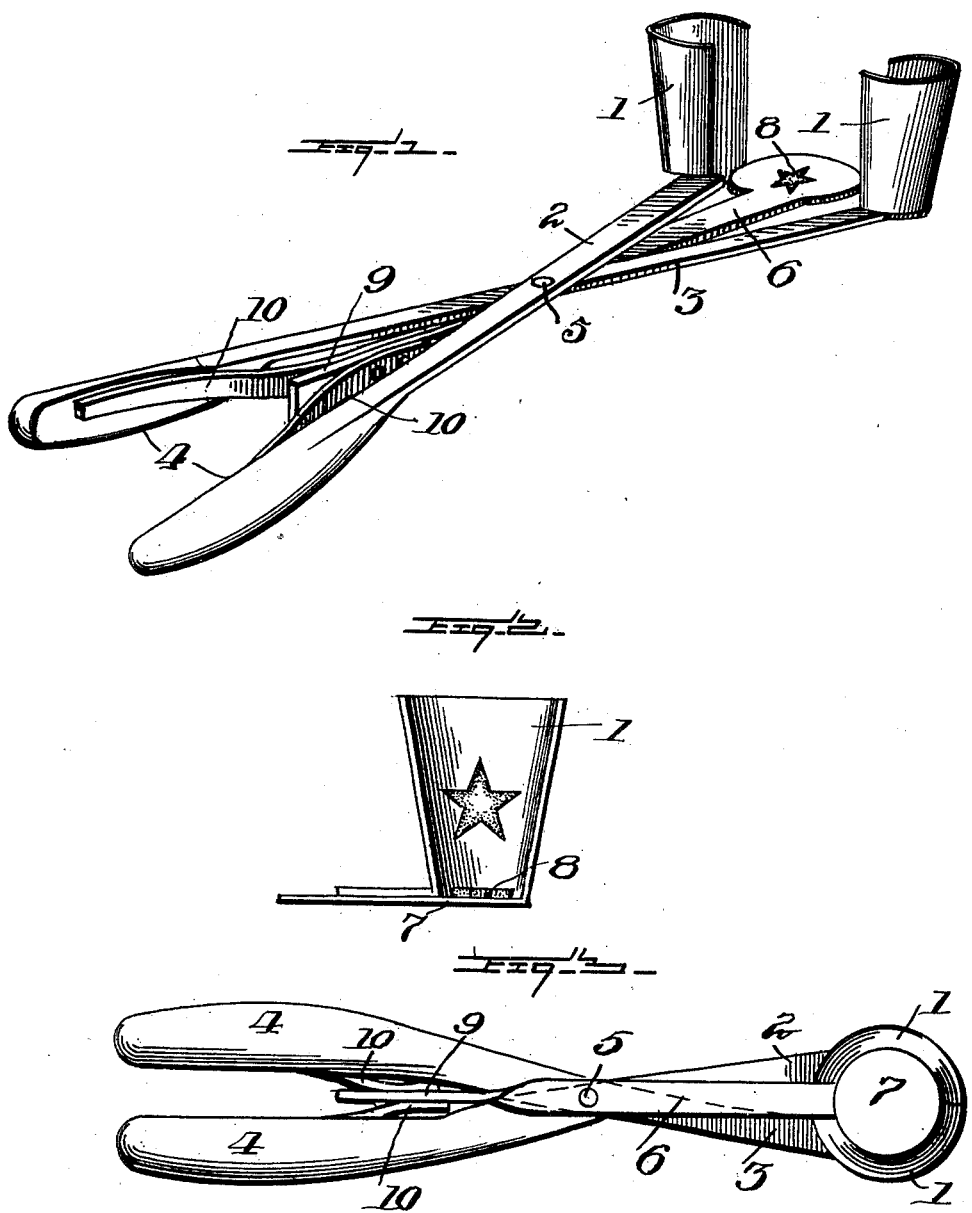

WILLIAM MAXWELL, OF PITTSBURG, PENNSYLVANIA.

ICE-CREAM DISHER AND MOLD.

SPECIFICATION forming part of Letters Patent No. 713,897, dated November 18, 1902.

Application filed September 11, 1902. Serial No. 122,922. (No model.)

*To all whom it may concern:*

Be it known that I, WILLIAM MAXWELL, a citizen of the United States of America, residing at Pittsburg, in the county of Allegheny and State of Pennsylvania, have invented certain new and useful Improvements in Ice-Cream Dishers and Molds, of which the following is a specification, reference being had therein to the accompanying drawings.

This invention relates to certain new and useful improvements in ice-cream dishers and molds, and has for its primary object to construct a disher and mold that may be conveniently and effectively operated with one hand instead of requiring two hands—one to hold the disher or mold and the other to turn the cutters—as is the case with the dishers or molds now in general use.

A further object of my invention is to construct a mold and disher without cutters for separating the cream from the inner face of the mold, thus obviating the necessity of employing a mold of a true conical or other like shape to the inner surface of which the cutters would conform, thereby enabling me to employ molds of various shapes, if desired.

With the above and other objects in view the invention resides in the novel construction, combination, and arrangement of parts, as will be hereinafter more specifically described and then particularly pointed out in the claims, and in describing the invention in detail reference will be had to the accompanying drawings, forming a part of this specification, and wherein like numerals of reference will be employed for designating like parts throughout the different views of the drawings, in which—

Figure 1 is a detail perspective view of my improved disher and mold, showing the mold open. Fig. 2 is a view in side elevation of one of the sections of the mold, showing the bottom plate of the mold and a part of the handle thereof. Fig. 3 is an inverted plan view of my improved disher and mold, showing the mold-sections closed.

To put my invention into practice, I provide a mold comprising two half-sections 1. In the present illustration these sections are each substantially in the form of a half-cone, though in the practice of the invention I do not wish to be understood as limiting myself to this particular form of mold, since any shape of mold-section that will when the two sections are brought together form a complete mold will serve the same purpose. These mold-sections are mounted, respectively, on the outer ends of the members 2 3, which terminate in the handles 4 at their other ends. These two handle members are pivoted together, as at 5, and the pin or rivet which fastens the same together also secures in position a supplemental or auxiliary member 6, provided on its outer end with a disk 7, that forms the bottom of the mold when the latter is formed by bringing the two mold-sections into engagement with each other. The two mold-sections at their apex or smaller end close against and fit neatly around the disk 7, and the mold-face of this disk and also the mold-faces of the mold-sections may be provided with dies, as shown at 8, for imparting fanciful designs to the cream molded in the disher. The auxiliary member 6 is formed from a flat bar of metal, and just back of the pivot 5 this bar is twisted, as at 9, so that the rear portion of this bar lies with its wide face at right angles to the wide face of that portion of the bar that is in front of the pivot, and thus presents a surface for securely riveting or otherwise suitably securing the springs 10 thereto. These springs are slightly bowed, and the bowed portions thereof lie in engagement with the inner faces of the handles 4.

The springs will normally hold the mold-sections extended or separated, as shown in Fig. 1, and when it is desired to use the disher the handles are grasped in the hand and pressure on the handles causes the mold-sections to be brought together and form the mold, and the same is held in this position during the time the disher is inserted into the cream to be dipped. When the disher is inverted and pressure on the handles is relieved, the mold-sections open, the molded cream carried thereby being prevented from adhering to either one or the other of the sections by reason of the bottom 7 remaining stationary and holding the same in its molded form, while its own weight will readily cause same to become disengaged from the bottom and fall onto the plate or like receptacle provided therefor.

While the device, as shown and described, is particularly adapted for dipping the cream from a can or other receptacle, yet it will be observed that it can be advantageously used for molding cream of different colors, as a cream of one color can be filled into one mold-section and a cream of a different color filled into the other mold-section and the two sections closed together to shape the cream into the form of the mold, after which the disher may be inverted and the cream of the different colors deposited on the plate or other receptacle provided therefor.

In the practice of the invention it will be observed that various changes may be made in the details of construction without departing from the general spirit of the invention.

Having fully described my invention, what I claim as new, and desire to secure by Letters Patent, is—

1. An ice-cream disher and mold comprising two handle members pivoted together, a mold-section carried on the outer end of each handle member, an auxiliary member pivoted to the handle members and carrying a disk at its outer end forming the bottom of the mold, and springs secured to the auxiliary member and bearing against the handle members to hold the mold-sections normally separated, substantially as described.

2. An ice-cream disher and mold comprising two handle members, a mold-section carried by each handle member, an auxiliary member carried by the handle members, a mold-bottom carried on the outer end of the auxiliary member, and means connected to the auxiliary member and engaging the handle members for holding the mold-sections normally separated, substantially as described.

3. An ice-cream disher and mold comprising two handle members, a mold-section carried by each handle member, an auxiliary member carrying a bottom for the mold, and means for holding the mold-sections normally separated, substantially as described.

In testimony whereof I affix my signature in the presence of two witnesses.

WILLIAM MAXWELL.

Witnesses:
A. M. WILSON,
E. E. POTTER.